Sept. 22, 1925.            W. H. MICHAEL            1,554,874
                            CHAIN TIGHTENER
                           Filed May 29, 1924
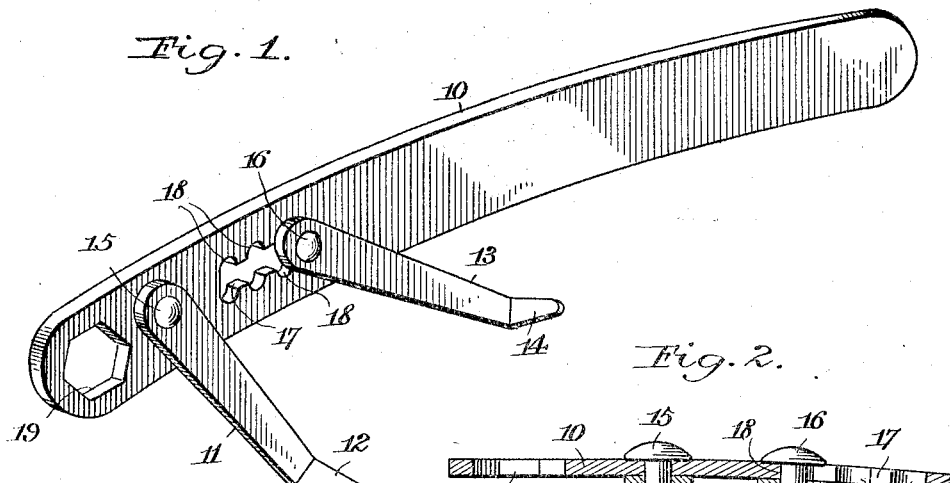
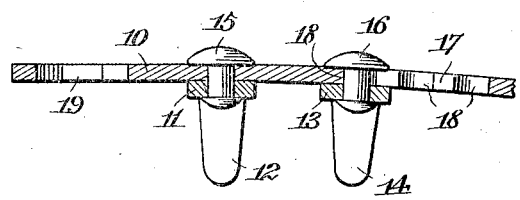
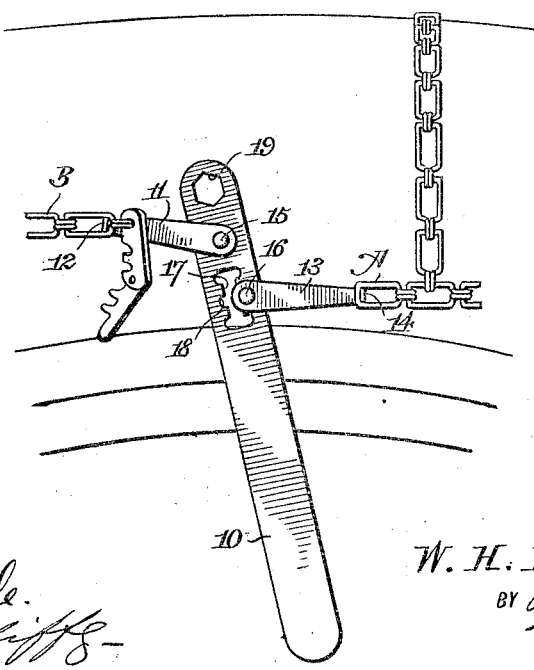

Patented Sept. 22, 1925.

1,554,874

UNITED STATES PATENT OFFICE.

WILLIAM HENRY MICHAEL, OF COLORADO SPRINGS, COLORADO.

CHAIN TIGHTENER.

Application filed May 29, 1924. Serial No. 716,759.

*To all whom it may concern:*

Be it known that I, WILLIAM H. MICHAEL, a citizen of the United States of America, and a resident of Colorado Springs, in the county of El Paso and State of Colorado, have invented a new and Improved Chain Tightener, of which the following is a description.

My invention relates to a tool adapted to be used in the emplacement or removal of the tire and for tightening tire chains of known form.

The general object of my invention is to provide a tool for the indicated purposes improved more particularly with respect to the manner of adjusting one of the chain-engaging elements relatively to the other to vary the effective leverage exerted by the tool when tightening a chain.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1 is a perspective view of a tool embodying my invention;

Figure 2 is a fragmentary longitudinal section adjacent to the front end of the tool;

Figure 3 is a side elevation of the tool showing the manner of using the same, the view including fragments of a tire chain and conventionally a portion of a wheel rim and tire;

In carrying out my invention in accordance with the illustrated example a flat lever 10 is provided which has pivotally secured a short distance from the forward end an arm 11, the outer free end 12 of which is bent at a right angle or approximately so to engage a link B of a tire chain. A second similar arm 13 is pivotally secured to lever 10 a short distance rearwardly on the arm 11, said arm 13 having its outer end 14 bent approximately at right angles to engage a link A at the opposite end of the tire chain. Thus, the arms 11, 13 are generally of hook form.

The arm 11 has a fixed pivot 15 while the pivot 16 of the arm 13 is adjustable to various positions lengthwise of the lever 10 to vary the distance between the pivots 15, 16 and thereby varying the effective leverage of lever 10 when in operation. In order to provide for the ready adjustment of the pivot 16 and at the same time provide for retaining the pivot in the adjusted position, the lever 10 is formed with a longitudinal slot 17 and with lateral recesses 18 oppositely disposed along the sides of the slot 17 so that the pivot 16 may be disposed in any one of the series of recesses 18 along either side of the head 17. Thus, the shifting of the pivot 16 varies the distance between the pivots 15, 16 representing respectively the fulcrum and load of the lever to thereby vary the leverage.

In the forward end of the lever 10 is a polygonal hole 19 to engage a polygonal nut in removing or emplacing a demountable rim and tire.

Having thus described my invention, I claim:

A tool of the class described comprising a lever, a swingable arm pivotally secured to said lever at a fixed point near the front end of the lever, said arm having a free end adapted to engage a chain link and a second pivoted arm on the lever distant from the first pivot, said lever having a longitudinal slot along which the second pivot is adjustable and having lateral recesses along both sides of the slot and complementary thereto into any one of which recesses the pivot of the second arm may be entered, both of said arms being disposed at the same side of the lever and having terminals directed laterally outward in the same general direction.

WILLIAM HENRY MICHAEL.